United States Patent [19]

Fulkerson

[11] 4,244,437

[45] Jan. 13, 1981

[54] APPARATUS FOR GENERATING WAVES IN THE GROUND

[76] Inventor: Earl Fulkerson, 4917 3A Street E, Gulf Lake Estates, Bradenton, Fla. 33507

[21] Appl. No.: 11,875

[22] Filed: Feb. 13, 1979

[51] Int. Cl.³ .............................................. G01V 1/14
[52] U.S. Cl. ................................... 181/114; 181/121
[58] Field of Search .................. 181/114, 121; 182/63; 173/23; 248/503

[56] References Cited

U.S. PATENT DOCUMENTS

| | | | |
|---|---|---|---|
| 2,740,488 | 4/1956 | Heaps | 181/121 |
| 3,073,397 | 1/1963 | Balogh | 173/23 |
| 3,277,977 | 10/1966 | Silverman | 181/114 |
| 3,393,763 | 7/1968 | Sundt | 181/114 |
| 3,754,604 | 8/1973 | Inaba et al. | 173/23 |
| 3,917,005 | 11/1975 | Cannon et al. | 173/23 |
| 4,050,540 | 9/1977 | Cholet et al. | 181/121 |
| 4,064,964 | 12/1977 | Norden | 181/114 |

*Primary Examiner*—Nelson Moskowitz
*Attorney, Agent, or Firm*—Charles W. Chandler

[57] ABSTRACT

A mobile generator for producing waves for seismic exploration. An elongated boom guides a wave-generating hammer along a linear path of motion to strike an anvil embedded in the ground, the boom being movable between several adjusted positions including a vertical position for generating a P wave, an inclined position for generating a shear wave, and a horizontal position for transport. An improved anvil for generating either a P wave or a shear wave is also disclosed.

7 Claims, 6 Drawing Figures

APPARATUS FOR GENERATING WAVES IN THE GROUND

BACKGROUND OF THE INVENTION

This invention is related to apparatus for generating seismic waves for locating sub-surface structure, and more particularly to mobile apparatus for generating a P wave and then a shear wave without the necessity of relocating the vehicle on which the wave-generating apparatus is mounted.

Apparatus is known for generating either P waves or shear waves in the earth to provide information regarding sub-surface structure. Generally a P wave is produced by a weighted hammer striking the horizontal surface of an anvil embedded in the earth. Shear waves are produced by the hammer striking a vertical impact surface.

One method for generating such a wave is to mount a hammer connected to a weight of about a thousand pounds on an upright boom. The hammer is then dropped so that it strikes an anvil resting on the ground. The boom is supported on a vehicle which must be repositioned to produce a shear wave in the same location as the P wave.

SUMMARY OF THE INVENTION

The broad purpose of the present invention is to provide a mobile wave-generating apparatus having a boom that can be positioned on a vehicle to produce a P wave and a shear wave without re-locating the vehicle, and which can be easily transported on the vehicle by pivoting the boom to a generally horizontal position.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
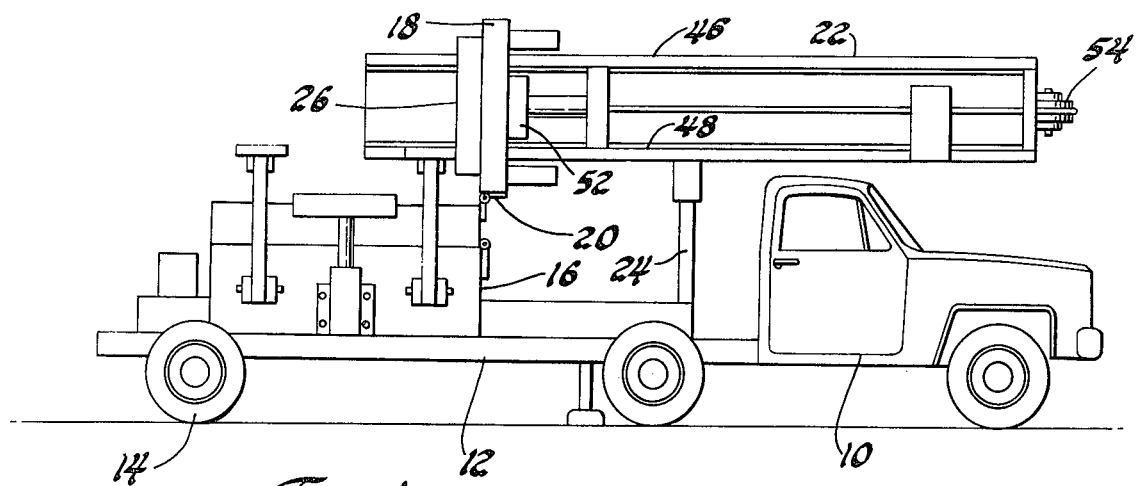
FIG. 1 shows a vehicle supporting a wave-generating apparatus in accordance with the preferred embodiment of the invention.

Referring to the accompanying drawings, FIG. 1 illustrates a tractor 10 adapted to tow a trailer 12 having wheel means 14. A leg on the front of the trailer is suited for supporting the trailer's front end when it is separated from the tractor. Frame means 16 are mounted on trailer 12, and a second, smaller frame 18 is connected by hinge means 20 to frame means 16. A boom 22 is supported on frame 18 in a generally horizontal position for transport, one end of the boom being supported on the trailer body and its opposite end being supported on a brace 24 mounted on the trailer tongue.

Figure 3:
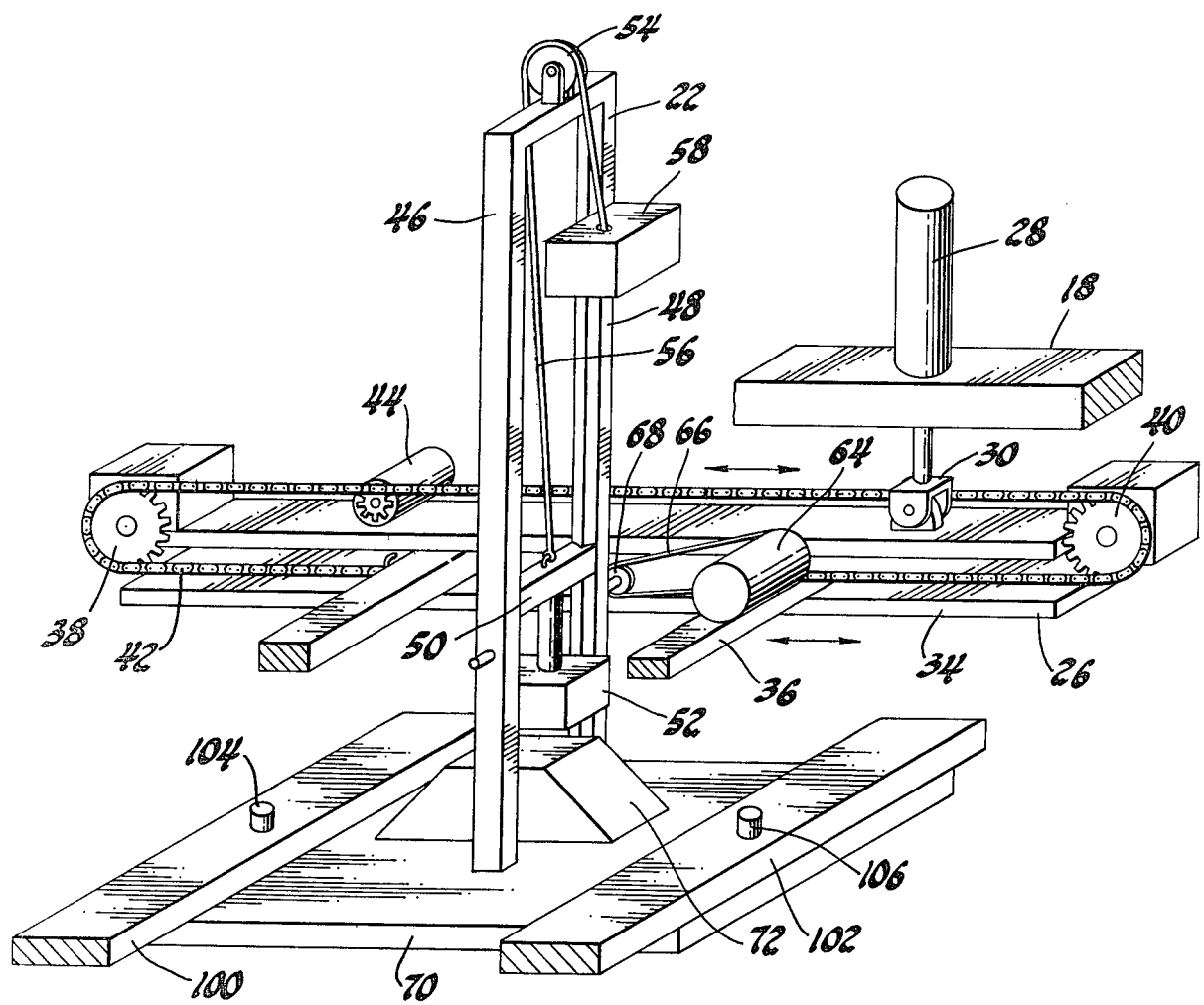
FIG. 3 is a fragmentary view showing the manner in which the boom is located with respect to the anvil.

Referring to FIG. 3, a smaller, four-sided positioning frame 26 is carried by frame means 18. When frame 18 is pivoted to support boom 22 in a vertical position, frame 26 is disposed beneath frame 18. Four hydraulic actuators 28 (only one shown), mounted at the four corners of frame 18, are connected by connectors 30 to frame 26 so that the user can independently adjust the height of each of the four corners of frame 26.

Figure 2:
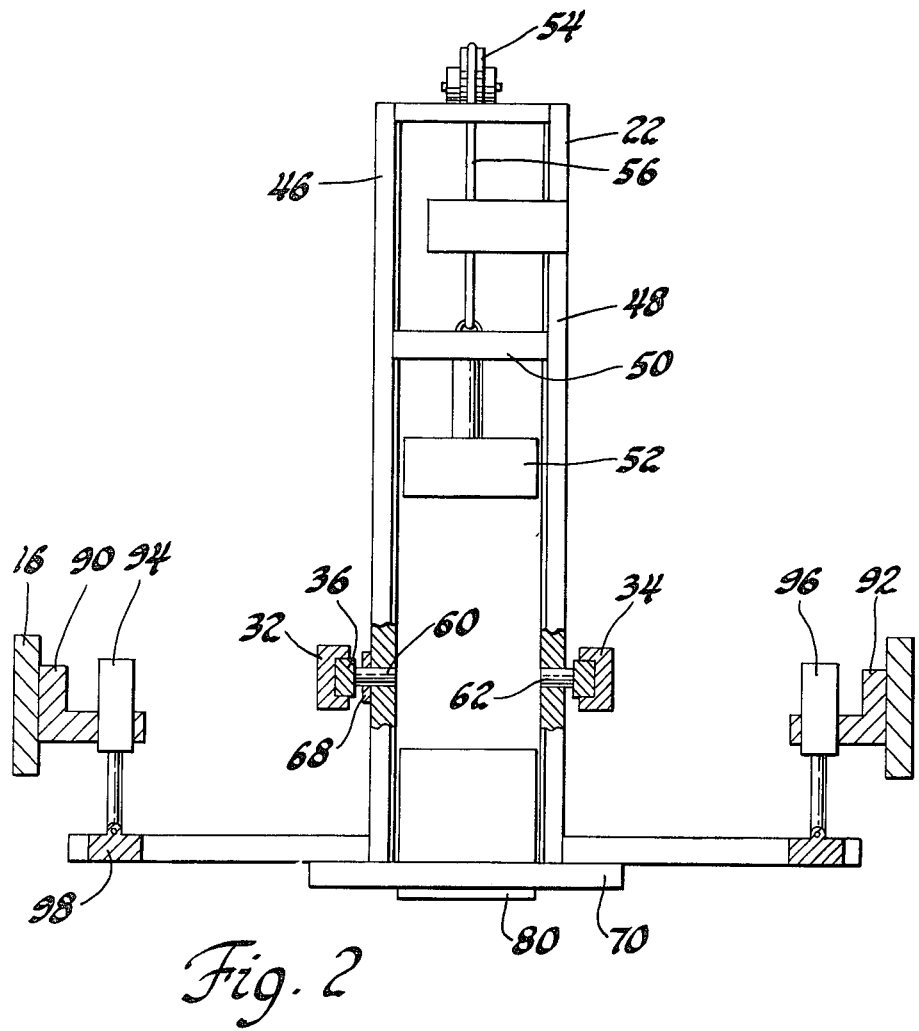
FIG. 2 is a sectional view showing the boom mounted for generating a P wave.

Frame 26 has two opposed channel-shaped members 32 and 34, as can best be seen in FIG. 2. A smaller four-sided frame 36 is slidably mounted in channels 32 and 34. A pair of sprocket means 38 and 40 are mounted on frame 26 on opposite sides of frame 36. Chain means 42 are connected to the opposite sides of frame 36 and mounted on sprocket means 38 and 40. Chain means 42 are connected to a motor 44 for moving frame 36 in a horizontal direction depending upon the direction of rotation of motor 44.

Referring to FIGS. 2 and 3, the boom has a pair of legs 46 and 48. A weight 50 has its opposite side edges slidably engaged with legs 46 and 48. A wave-generating hammer 52, of about a thousand pounds, is suspended beneath the carriage. A pulley 54 is mounted at the upper end of the boom, and supports a cable 56 having one end connected to weight 50 and its opposite end connected to hydraulic actuator means 58 adapted to raise hammer 52 to a position adjacent the top of the boom and then to drop it in a downward wave-generating motion.

Pivot means 60 and 62 support the boom for pivotal motion on frame 36, as best illustrated in FIG. 2. By raising frame 26, the boom can be pivoted from a vertical position, illustrated in FIG. 3, to an inclined position illustrated in FIG. 4. Referring to FIG. 3, a hydraulic actuator 64, mounted on frame 36, is connected by chain means 66 to a sprocket 68, mounted on pivot means 60, to pivot the boom between adjusted positions with respect to the ground.

Referring to FIG. 3, a pad 70 is mounted beneath the boom. Anvil 72 is attached to pad 70. The anvil and pad have a combined weight of about a thousand pounds. Anvil 72 has an upper horizontal impact-receiving surface 74, a second impact-receiving surface 76, at an angle of about 45° with respect to surface 74, and an impact-receiving surface 78 disposed at an angle of about 45° with respect to surface 74. Surfaces 74, 76, and 78 are each adapted to receive an impact from hammer 52 depending upon its direction of motion.

A plurality of fins, generally indicated at 80, are mounted beneath anvil 72 embedded in ground 82. A typical fin 83 has a surface 84 parallel to impact-receiving surface 76, and a second surface 86 parallel to surface 78. The fins are located in a plane parallel to top surface 74. Thus, it can be seen that each fin has ground-engaging surfaces disposed to efficiently transfer the impact motion of the hammer to the ground.

Referring to FIG. 2, a pair of opposed L-shaped supports 90 and 92 are mounted on opposite sides of frame 16. A pair of hydraulic actuators 94 and 96 are mounted on supports 90 and 92, respectively. A four-sided frame 98 is connected to the lower ends of hydraulic actuators 94 and 96. Referring to FIG. 3, frame 98 has a pair of sides 100 and 102 for engaging the top of pad 70. Guide means 104 and 106, carried by pad 70, are received through appropriate openings in sides 100 and 102 to locate it with respect to the pad. Actuators 94 and 96 are independently movable to provide the user means for properly aligning pad 70 with respect to the boom.

Figure 4:
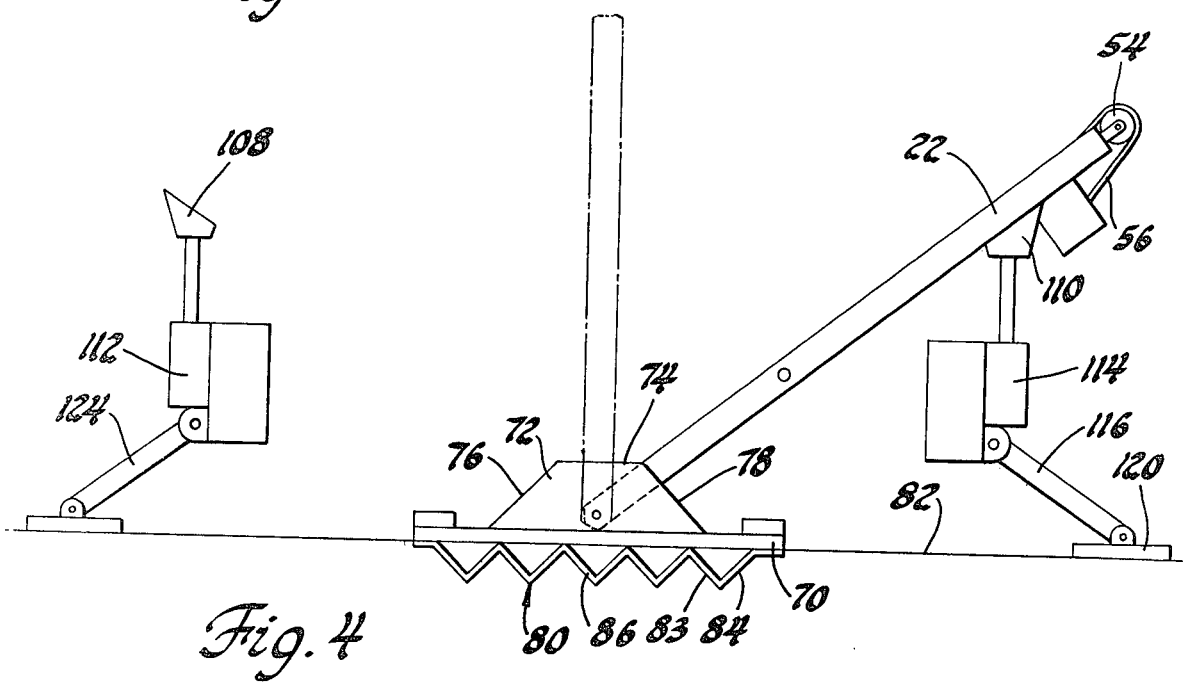
FIG. 4 is a view showing the boom mounted for generating a shear wave.

Referring to FIG. 4, a pair of supports 108 and 110 are mounted on opposite sides of frame 16. A hydraulic actuator 112 supports support 18 so that it can be raised and lowered to an adjusted position. A hydraulic actuator 114 supports support 110 so that it can be raised and lowered to an adjusted position.

Boom 22 is illustrated as being supported in an inclined position in which its legs are mounted on pad 70 on opposite sides of the anvil, and its upper end is mounted on support 110. The boom is mounted in this position to support hammer 52 for motion in a perpendicular direction with respect to impact-receiving surface 78. Similarly, the boom can be pivoted toward the opposite side of the frame so that it is mounted for guiding the hammer toward a wave-generating motion perpendicular to impact-receiving surface 76.

Figure 5:
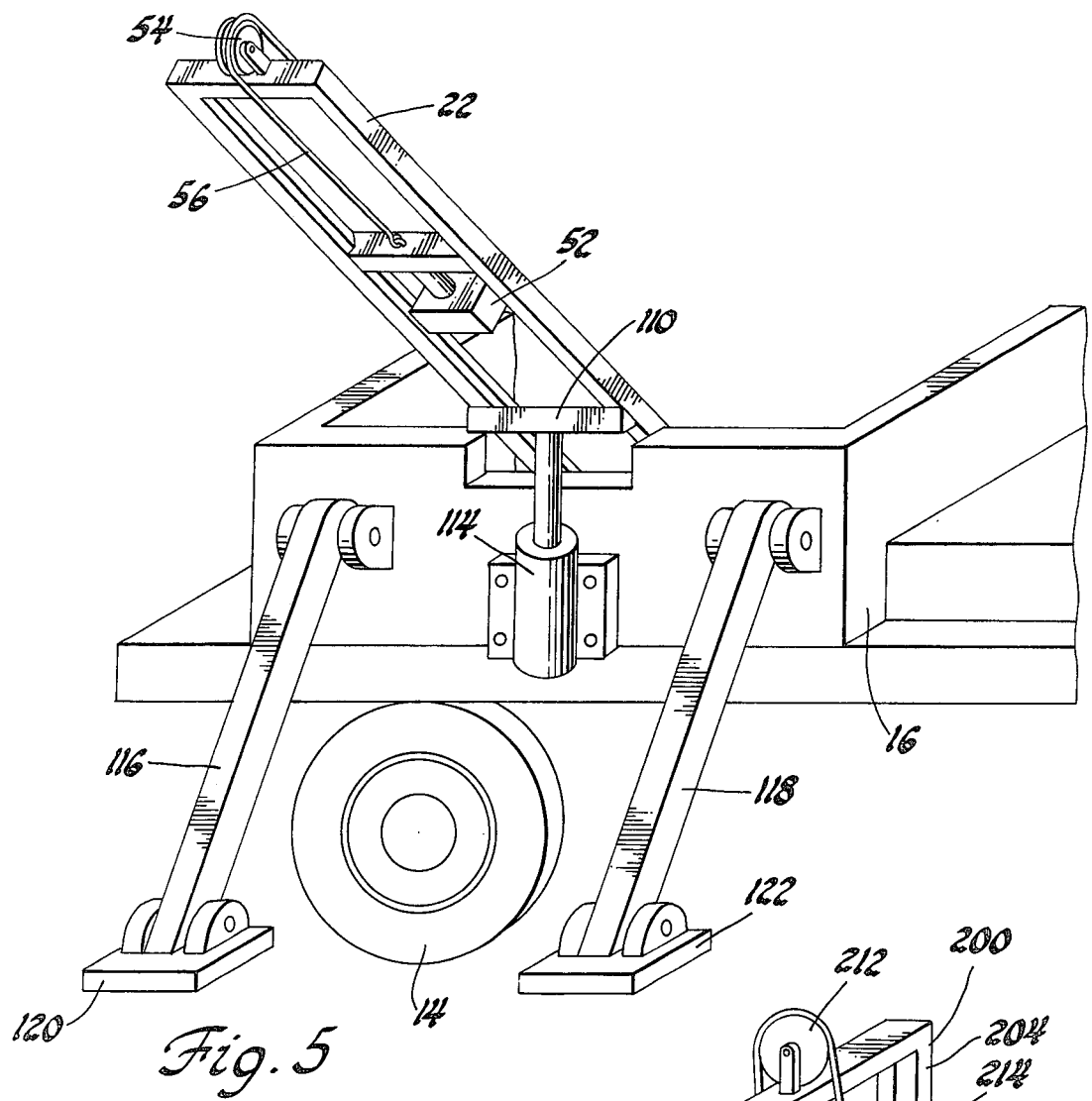
FIG. 5 is a fragmentary view showing outriggers for bracing the vehicle for a shear wave.

Referring to FIGS. 4 and 5, a pair of outriggers 116 and 118 are carried on frame 16. Outrigger 116 has a pad 120, and outrigger 118 has a pad 122 for engaging the ground to brace the vehicle when hammer 52 is being moved to generate a shear wave. Similarly, a pair of outriggers 124, only one shown, are mounted on the opposite side of the vehicle to brace it when the boom is inclined in the opposite direction.

In operation, the boom is supported in a generally horizontal position in FIG. 1, in which frame 18 is supported above one side of frame 16. When the vehicle has been properly positioned, frame 18 is pivoted down on top of frame 16 so that the boom is supported in an upright position.

Normally the anvil is raised by actuators 94 and 96 above the ground when the boom is in its transport position. To generate a wave, the anvil is located and then lowered by actuators 94 and 96 until fin means 80 are received in the ground. The fins are firmly pressed into the ground by hydraulic actuators 94 and 96.

To generate a P wave, the boom is supported in an upright position with its legs on opposite sides of anvil 72. The boom is located with hammer 52 in a central position above surace 74. Hammer 52 is raised and then dropped by actuator 58 to embed the anvil in a solid position in the ground. When the anvil is properly positioned, the user then raises and drops the hammer in a wave-generating motion to produce waves detectable by seismic detectors in the manner well known to those skilled in the art.

To generate a shear wave, the user leaves the anvil in position, raises hammer 52 and the boom, repositions the boom by means of motor 44 to a position between the anvil and the side of the vehicle. He then employs actuator 64 to tilt the boom so that its lower end is disposed on pad 70 and its upper end is resting on support 110. Outriggers 116 and 118 are lowered to engage the ground to brace the vehicle for impact. The hammer is then raised and dropped to produce a wave. A similar procedure is followed if the user desires to produce a shear wave in the opposite direction that is by repositioning the boom so that it is supported on support 108.

It can be seen that by raising and lowering support 110, the boom can be precisely located so that hammer 52 moves in a direction perpendicular to the impact-receiving surface 78. When the user has completed the wave-generating procedure, he then raises the boom to its vertical position, and pivots frame 18 to its horizontal transport position illustrated in FIG. 1. The anvil is then raised by actuators 94 and 96 to a position above the axle of wheel means 14.

The power for each of the actuators can be supplied either from a conventional power take-off on the vehicle, or from a self-contained gasoline engine mounted on the trailer.

Actuator 58 can be controlled by appropriate hydraulic control system to permit the user to generate individual impacts by the hammer, or to provide a rhythmic cycle of impacts, that is, several impacts per minute.

As an alternative to the outriggers, appropriate weights can be mounted on the vehicle to provide support for a shear wave.

Figure 6:
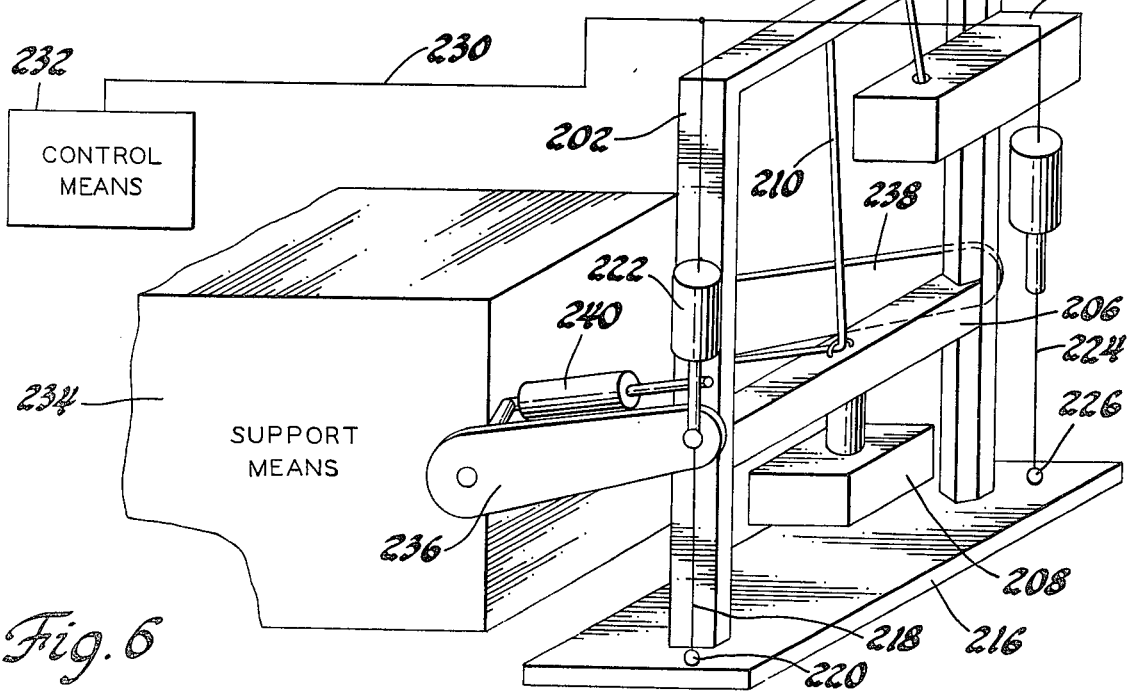
FIG. 6 is a perspective view of another embodiment of the invention.

FIG. 6 illustrates another embodiment of the invention comprising an elongated linear boom 200 having legs 202 and 204. A weight 206 is supported between the two legs and carries a hammer 208. A cable 210 is mounted on a pulley 212, and has one end connected to carriage 206 and its opposite end operatively connected to actuator 214. Actuator 214 is mounted on the boom for raising hammer 208 and then dropping it to produce a seismic wave.

A plate 216 is mounted beneath the boom so as to be movably engaged with the lower ends of legs 202 and 205. A cable 218 has its lower end connected at 220 to plate 216. A hydraulic actuator 222, mounted on leg 202, is connected to cable 218 for keeping it in a taut position such that the plate is always engaged with the lower end of leg 202.

Similarly, a cable 224 is connected at 226 to plate 216. A hydraulic actuator 228, mounted on leg 204, is connected to cable 224 to keep it in a taut position. Preferably the two actuators 222 and 228 are connected by hydraulic conduit means 230 to control means 232 having a float valve adapted to keep cable 218 and 224 in a taut position.

Plate 216 is pivotable with respect to the lower end of the legs so that the boom can be tilted in a range of angles with respect to the ground. As the boom is raised, the cables raise plate 216 with the boom so as to be always engaged with the bottom end of the two boom legs.

Appropriate support means 234 have a pair of arms 236 and 238 pivotally connected to the boom for raising and lowering it. A hydraulic actuator 240 is mounted on arm 236 and adapted to pivot the boom to any desired position with respect to the ground.

In this version of the invention, the user can readily raise and lower the boom with respect to the ground, and tilt it to a desired angle with respect to the ground depending upon the angle of motion the hammer is to move with respect to the ground.

Having described my invention, I claim:

1. Apparatus for generating waves in the ground, comprising:
   a frame;
   an elongated, linear, rigid boom movably mounted on the frame;
   a hammer mounted on the boom for movement therealong;
   an anvil mounted on the ground beneath the frame in a first position thereto to the struck by the hammer;
   cable means mounted on the boom and connected to the hammer for dropping it from an elevated position to strike the anvil; and
   positioning means mounted on said frame and connected to the boom for positioning it in a first position with respect to the frame to guide the hammer for a downward motion in a first direction toward the anvil, said positioning means being operative to move the boom with respect to the frame to a second position thereto to guide the hammer for a downward motion in a second direction toward the anvil whereby the hammer is operative to generate a wave in the ground by a downward motion in either said first direction on said second direction without repositioning either the frame or the anvil with respect to the ground.

2. Apparatus as defined in claim 1, including cable means connecting the lower end of the boom to the anvil, and actuator means operative to maintain the anvil engaged with the lower end of the boom as it is being raised from the ground.

3. Apparatus as defined in claim 1, including hydraulic actuator means carried on the frame for pressing the anvil to a firm position into the ground.

4. Apparatus as defined in claim 1, including a ground-engaging wheel mounted on the frame.

5. Apparatus as defined in claim 1, including a vehicle, said frame being mounted thereon so as to be movable between a first position in which the boom is supported in a position adjacent the anvil for guiding the hammer in a wave-generating motion, and a second position in which the boom is supported in a generally horizontal position for movement with the vehicle.

6. Apparatus as defined in claim 1, in which the positioning means comprises a second frame supported above the anvil, first power means connected to the boom for raising it away from the anvil, and second power means connected to the boom for moving it along a generally horizontal path of motion.

7. Apparatus as defined in claim 6, in which the anvil has a base and the boom is mounted on the anvil base as the hammer is being dropped toward the anvil.

* * * * *